R. E. HELLMUND.
DYNAMO ELECTRIC MACHINE.
APPLICATION FILED MAR. 23, 1914.
1,233,353.  Patented July 17, 1917.
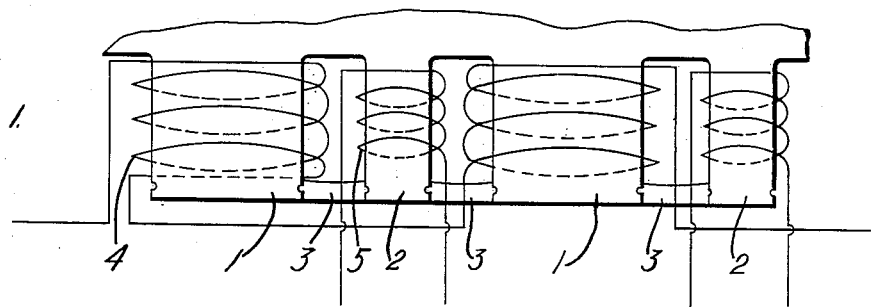
Fig. 1.
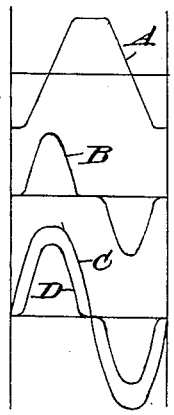
Fig. 2.
Fig. 4.
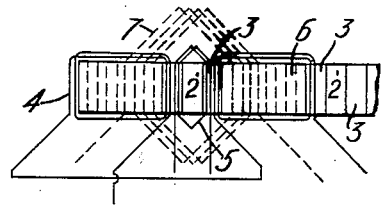
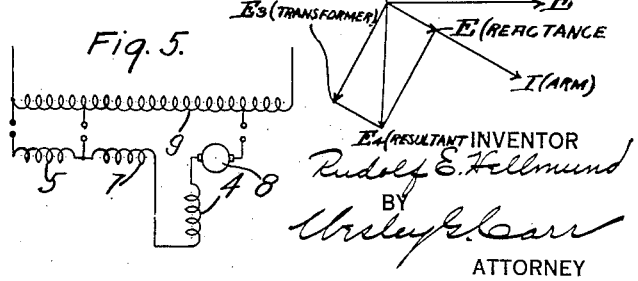

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,233,353.  Specification of Letters Patent.  Patented July 17, 1917.

Application filed March 23, 1914. Serial No. 826,551.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Dynamo-Electric Machines, of which the following is a specification.

My invention relates to dynamo-electric machines, and it has special reference to alternating current motors of the commutator type.

The object of my invention is to provide a simple and inexpensive means for effecting an improvement in commutation in machines of the above-indicated character under all conditions of operation.

Alternating-current motors of the commutator type are, in many cases, provided with field structures comprising a plurality of alternately disposed main polar and auxiliary or interpolar projections that are provided with suitable field windings therefor and some form of compensating winding. To secure perfect commutating conditions in the machine, the rotational voltage induced in the armature coils undergoing commutation should be exactly equal and opposite to the voltage resulting from the combination of the main field transformer voltage and the armature reactance voltage, not only in its effective value but also in its instantaneous values. As the effect of the armature reaction is practically suppressed by the compensating winding, the neutralizing voltage is induced wholly by the cross field produced by the windings on the interpolar projections. In some motors, the field structure is of such design that the main field winding is adapted, at normal excitation, to produce a relatively high degree of saturation in the main polar projections and, as a result, the main field flux will follow a certain non-sinusoidal curve. The interpolar winding, however, being shunted across a portion of the operating transformer winding, energizes the interpolar projections in such manner that they are adapted to produce a cross field having a sinusoidal flux curve in the armature coils undergoing commutation, provided the impressed electromotive force wave is of sinusoidal form; consequently, the conditions for satisfactory commutation above described cannot be obtained.

However, if some auxiliary means for converting the cross field flux curve in the armature coils undergoing commutation to substantially the shape of the non-sinusoidal flux curve produced by the main field winding can be provided, then the commutation will be sensibly improved.

I have found that, by providing magnetizable wedges that are severally magnetically associated with the pairs of polar projections in proximity to the machine air gap, to carry a larger proportion of the cross field flux at relatively lower values than at higher values thereof, then the above-mentioned conversion of the cross field sinusoidal flux curve in the armature coils undergoing commutation is obtained and the commutating conditions in the machine are bettered.

In the accompanying drawing, Figure 1 is a diagrammatic development view of a portion of a dynamo-electric machine embodying my invention; Fig. 2 is a diagram of the wave forms of the field fluxes and voltages in certain portions of the machine shown in Fig. 1; Fig. 3 is a vector diagram showing the relation of the different electromotive forces operating in an armature coil undergoing commutation, together with the main current and electromotive force; Fig. 4 is a diagrammatic development view of a portion of a dynamo-electric machine differently constructed from the machine shown in Fig. 1 and embodying my invention; and Fig. 5 is a diagrammatic view of a control system embodying a dynamo-electric machine constructed in accordance with what is shown in Fig. 4.

Referring to the drawing, the portion of a dynamo-electric machine here shown comprises a field structure provided with a plurality of alternately disposed main polar projections 1, and interpolar projections 2 and a plurality of magnetizable members, such as wedges 3, that are suitably magnetically secured between the pairs of adjacent polar projections, near the free ends thereof, for a purpose hereinbefore specified. It will be understood that integral bridging members between the polar projections may be employed, if desired. Suitable field windings 4 and 5 are provided for the main polar projections 1 and the interpolar projections 2, respectively, in accordance with familiar practice.

The operation of the apparatus embodied in my invention may be briefly described as follows: The design of the main polar projections is such that a relatively high degree of saturation occurs therein under normal operating conditions, and, consequently, a flattened flux wave, similar to that designated as A in Fig. 2, is produced by the main polar projections. The voltage wave resulting from such a flattened flux wave is designated as B. On the other hand, the interpolar projections 2 are excited to tend to produce a substantially sinusoidal flux wave, as indicated by the curve C in Fig. 2. In order to insure proper commutating conditions in the motor, the interpolar projections should produce, in the armature coils undergoing commutation, a flux wave exactly equal and opposite, at every point, to the voltage wave represented by the curve B of Fig. 3. As a means for changing the wave form of the cross field flux and the resultant voltage induced in the armature coils undergoing commutation by the interpolar projections 2, the magnetizable wedges 3 are provided in proximity to the machine air gap.

The wedges 3 are of relatively small section and, consequently, carry a relatively large proportion of the total interpolar flux when the motor current is of a relatively low value, and a much smaller proportion of the interpolar flux when the motor current is of relatively high value. As a result, the wave form of the interpolar flux passing through the air gap and, consequently, of the rotational voltage induced in the armature coils undergoing commutation, is modified, as indicated by the curve D, to a shape substantially similar to that of the curve B of Fig. 2, and of the opposite direction. Fig. 3 shows the vectorial relation of the several electromotive forces operating in an armature coil undergoing commutation in which $E_4$ represents the resultant of the transformer and reactance voltage $E_3$ and $E_2$, respectively. The cross field winding being shunted across a portion of the operating transformer winding produces a flux that is nearly in quadrature with the terminal voltage E. This flux induces a voltage $E_1$ in the coils undergoing commutation (due to the rotation of the armature) which is in phase with the flux and is substantially equal and opposite to the resultant voltage $E_4$. As the wave forms of the voltages $E_1$ and $E_4$ are substantially similar, as set forth in Fig. 2, particularly favorable commutating conditions are secured by the use of my invention.

Referring now to Figs. 4 and 5, the portion of a dynamo-electric machine comprises a plurality of alternately-disposed main polar projections 6 and interpolar projections 2, a plurality of the wedges 3 disposed between the pairs of polar projections, the main or exciting field winding 4 that is wound around the main polar projections 6, a distributed compensating field winding 7 that is threaded through the main polar projections, in accordance with familiar practice, and the interpolar cross field winding 5 that is disposed around the interpolar projections 2. In Fig. 5, the several field windings are shown arranged in accordance with the well known doubly-fed connection with an armature winding 8, the motor as a whole being adapted for connection to a suitably energized transformer winding 9.

I do not wish to be restricted to the specific structural details or circuit connections herein set forth, but desire that only such limitations shall be imposed as are indicated in the appended claims.

I claim as my invention:

1. An alternating-current dynamo-electric machine comprising a commutated armature winding, a field magnet provided with main and auxiliary polar projections carrying exciting windings, means for energizing the exciting windings of said main polar projections to produce a non-sinusoidal flux wave in said armature winding, means for energizing the exciting windings of said auxiliary polar projections to tend to produce a substantially sinusoidal flux wave therein, and means associated with said exciting windings to modify said latter flux wave into a wave, effective on the armature winding, of substantially the same shape as the former flux wave.

2. An alternating-current dynamo-electric machine comprising a commutated armature winding, a field magnet provided with main and auxiliary polar projections carrying exciting windings, means for energizing the exciting windings of said main polar projections to produce a non-sinusoidal flux wave in the coils of said armature winding that are undergoing commutation, means for energizing the exciting windings of said auxiliary polar projections to tend to produce a substantially sinusoidal flux wave therein, and means magnetically associated with said exciting windings to modify said latter flux wave into a wave, effective on the armature winding, of substantially the same shape as the former flux wave.

3. An alternating current motor of the commutator type comprising an armature, a field magnet structure provided with a plurality of alternately disposed main polar and interpolar projections, a main field winding excited to produce a relatively high degree of saturation in the main magnetic circuit, whereby a non-sinusoidal main flux wave is produced in the armature coils undergoing commutation, an auxiliary field winding excited to produce a flux wave of substantially sinusoidal form in said interpolar projections, whereby a substantially sinusoidal flux wave tends to be produced in said coils, and magnetic means severally associated with the pairs of polar projections for varying magnetic conditions in the machine to convert said sinusoidal wave substantially to the shape of said non-sinusoidal wave during the normal operation of the motor.

4. An alternating current motor of the commutator type comprising an armature, a field magnet structure provided with a plurality of alternately disposed main polar and interpolar projections, a main field winding excited to produce a relatively high degree of saturation in said main polar projections, whereby a non-sinusoidal main flux wave is produced in the armature coils undergoing commutation, an interpolar field winding excited to produce a flux wave of substantially sinusoidal form in said interpolar projections, whereby a substantially sinusoidal flux wave tends to be produced in said coils, and a plurality of magnetizable members severally magnetically secured between the pairs of polar projections in proximity to the machine air gap for carrying a larger proportion of the interpolar flux at relatively low values than at higher values thereof to convert said sinusoidal wave substantially to the shape of said non-sinusoidal wave in the armature, thereby producing good commutating conditions in the motor.

5. An alternating current motor of the commutator type comprising a plurality of coöperating windings, a field structure provided with a plurality of main polar and interpolar projections, means for producing an alternating magnetic flux in said main polar projections, said projections being highly saturated during each half-cycle of said flux, and magnetizable means severally associated with the pairs of adjacent polar projections near the free ends thereof.

6. An alternating current motor of the commutator type comprising an armature, a plurality of field windings coöperating therewith, a field structure for said windings provided with a plurality of alternately disposed main and auxiliary polar projections, means for producing an alternating magnetic flux in said main polar projections, said projections being highly saturated during each half-cycle of said flux, and a plurality of magnetizable wedges magnetically secured between the pairs of polar projections in operative proximity to the machine air gap.

In testimony whereof, I have hereunto subscribed my name this 19th day of Mar., 1914.

RUDOLF E. HELLMUND.

Witnesses:
J. V. Dobson,
B. B. Hines.